UNITED STATES PATENT OFFICE.

RAYMOND A. BECKWITH, OF HARTFORD, CONNECTICUT, ASSIGNOR TO SUTTON, ASPINWALL & COMPANY, OF NEW YORK, N. Y., A CORPORATION OF NEW YORK.

MOTOR-VEHICLE TRANSMISSION AND CLUTCH MECHANISM.

1,222,715.  Specification of Letters Patent.  Patented Apr. 17, 1917.

Application filed November 23, 1916. Serial No. 132,939.

*To all whom it may concern:*

Be it known that I, RAYMOND A. BECKWITH, a citizen of the United States, residing at Hartford, in the county of Hartford and State of Connecticut, have invented a new and useful Improvement in Motor-Vehicle Transmission and Clutch Mechanism, of which the following is a specification.

This invention relates to the mechanism employed for transmitting power from the engine to the driving wheel of a motorcycle, motor tricycle, automobile, motor boat, or similar motor driven vehicle, which is interposed between the engine crank shaft and the driving sprocket or gear.

The object of the invention is to provide a variable speed transmission and clutch mechanism that is particularly adapted for such vehicles, which is reliable and powerful, very compact, cheaply constructed, readily taken care of, and easily operated.

In attaining this end the variable speed transmission, the clutch for releasing the transmission or for connecting the high and low speed shafts, the means for actuating the clutch members, and the means for actuating the engine valves, if such are used, are combined into a unitary concentric structure and can be arranged in the engine case close to the crank shaft from which the power is derived, as more particularly hereinafter set forth.

In the embodiment of the invention illustrated and described the transmission is of the two-speed class; the clutch is of the spring-actuated lever-controlled disk type; the valve mechanism may be arranged for controlling either the intake valve or the exhaust valve or both valves, depending on the style of engine with which the organization is used; and the clutch lever has three positions, at one extreme the high speed drive is operatively connected by the clutch members, at the other extreme the low speed drive is operatively connected by the clutch members, and in the intermediate or neutral position the transmission is disconnected so that neither the high nor the low speed shafts are clutched allowing the engine to run idle.

Figure 1:
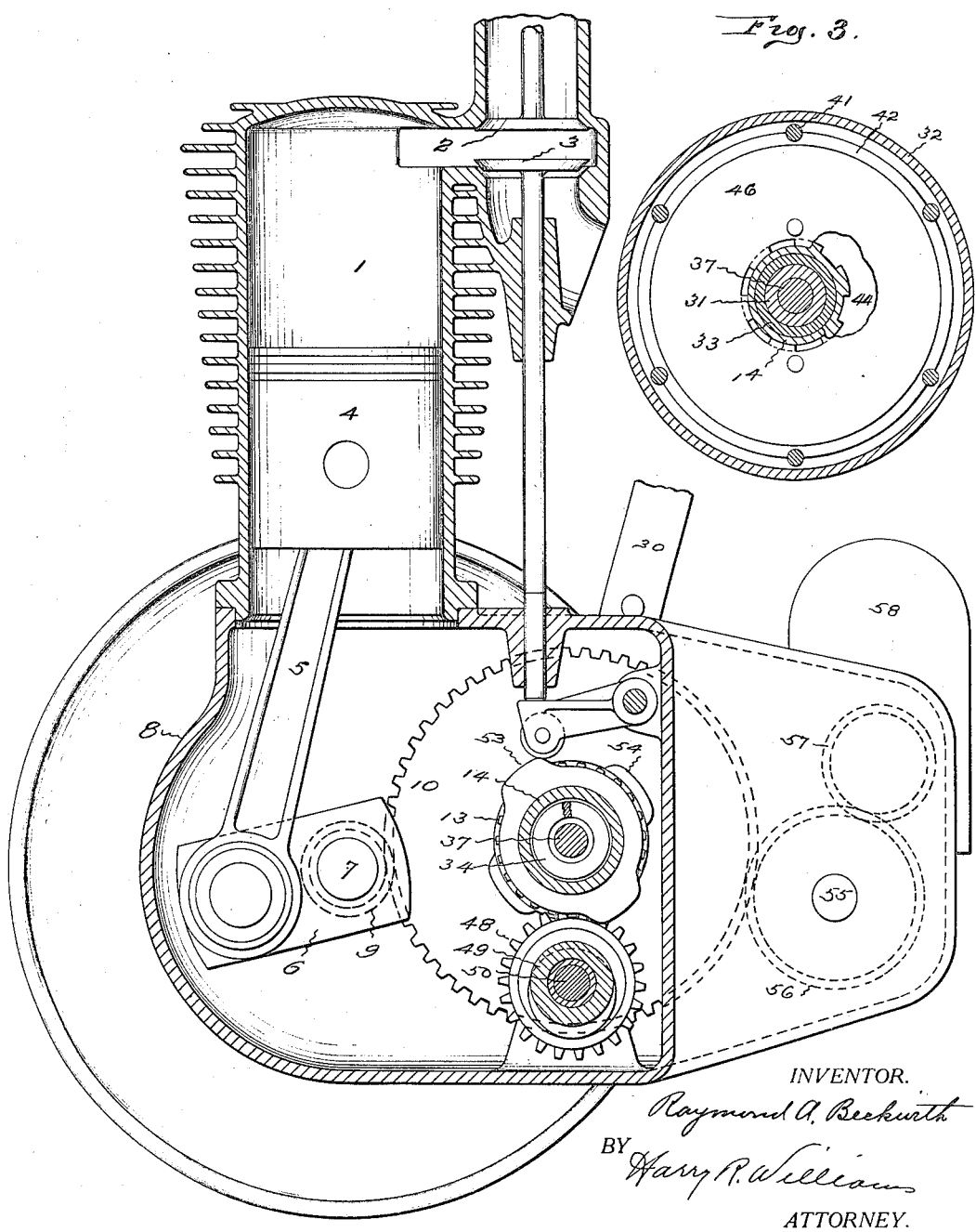
Figure 2:
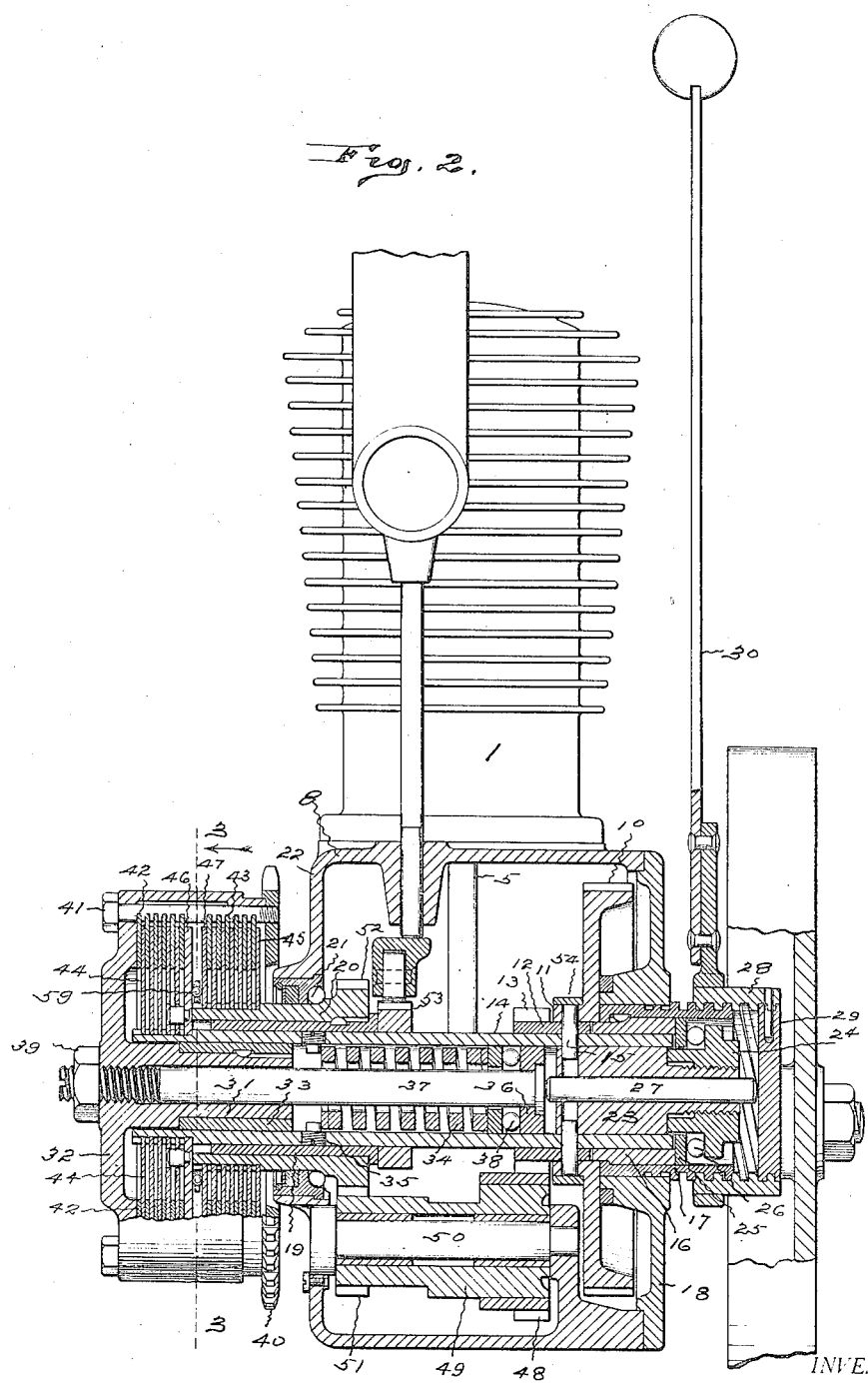

In the accompanying drawings Figure 1 shows a vertical longitudinal section of the mechanism chosen to illustrate an embodiment of the invention. Fig. 2 is a vertical transverse section taken through the clutch parts and the transmission shafts. Fig. 3 is a section through the clutch on the plane indicated by the dotted line 3—3 on Fig. 2.

The engine indicated has a cylinder 1 of the air-cooled type with intake valve 2 and exhaust valve 3 of common form. The usual piston 4 is connected by piston rod 5 with the crank 6 on the crank shaft 7 that is mounted in the crank case 8 in the ordinary manner.

On the crank shaft is a pinion 9 meshing with which is a gear 10. The hub 11 of the gear 10 is mounted on the hub 12 of a pinion 13, and this gear and pinion are fastened together and to the tubular high speed shaft 14 by pins 15 that are passed through the hubs of the gear and pinion and into the shaft. At one end the shaft 14 turns in a bushing 16 fitted in a sleeve 17 that is fixed in the hub of the plate 18 which is fastened to the side of the crank case. Near the other end the tubular shaft 14 turns in a bushing 19 fitted in the tubular low speed shaft 20 that is mounted to turn in a common form of ball bearings 21 arranged in the side wall 22 of the crank case.

A plug 23 is fastened in the righ hand end of the shaft 14 and screwed on the outer end of this plug is a nut 24 between which and the ring 25 that is fastened inside of the sleeve 17 is a ball thrust bearing 26 of common form. Loosely extending through the plug is a pin 27. The outer surface of the projecting end of the sleeve 17 is threaded, and fitting on this is an interiorly threaded sleeve 28. A plate 29 is threaded into and fastened in the end of the threaded sleeve 28 so as to engage the end of the pin 27, and a hand lever 30 is fastened on the sleeve for turning it and causing it to travel in and out as it turns on the threaded sleeve 17.

The hub 31 of the clutch shell 32 is fitted in the left hand end of the tubular shaft 14, a bushing 33 being arranged on the hub so as to form a bearing between the exterior of the hub and the interior of the shaft. In the shaft 14 near the middle is a stiff spiral spring 34. At one end this spring bears against screw studs 35 that project inwardly from the tubular shaft 14. Interposed between the other end of the spring and collar 36 on the head of a rod 37 is a common antifriction thrust bearing 38. The inner end of the head of the rod 37 engages the pin 27, the shank of the rod near the outer end is threaded and screwed into the hub of the clutch shell, and a clamp nut 39 is screwed onto the end of the rod. The outer end of the rod is slotted so that it may be turned for adjusting the thrust of the spring.

The driving sprocket 40 is fastened by bolts 41 to the inside of the clutch shell and forms the inner wall thereof. In the clutch shell are two series of annular plates 42 and 43. The outer edges of these annular plates are notched so as to fit the bolts. This rotarily connects the plates with the clutch shell and the driving sprocket, but leaves the plates free to move sidewise. Interposed between the outer series of annular plates 42 are a series of disks 44 which are mounted on the outer end of the high speed tubular shaft 14 so that they will rotate therewith but will be free to move sidewise thereon. Interposed between the inner series of annular plates 43 are a series of disks 45 which are mounted on the outer end of the low speed tubular shaft 20 so that they will rotate therewith but will be free to move sidewise thereon. Inside or back of the series of plates 42 and disks 44 is a disk 46 that is immovably fastened on the high speed shaft 14, and outside or in front of the series of plates 43 and disks 45 is a disk 47 that is movably fastened on the low speed shaft 20. Between the fixed disk 46 on the high speed shaft and the movable disk 47 on the low speed shaft is a thrust bearing 59.

The pinion 13 that is fastened to the gear 10 and to the tubular shaft 14 meshes with a gear 48 fastened on one end of a bushed sleeve 49 which turns on the arbor 50 that is secured in the lower part of the crank case. On the other end of the sleeve 49 is a pinion 51 that meshes with the gear 52 on the low speed tubular shaft 20. An exhaust valve cam 53 may be fastened to the tubular shaft 14 adjacent to the gear 52, and an intake valve cam 54 may be fastened on the hub 11 of the gear 10. If either or both of the valves are not cam operated these cams may be omitted. Any ordinary form of lever, pedal or hand cranking device such as is commonly used for starting the engine of a motorcycle, may be connected with the shaft 55 that is mounted in the crank case and which has a gear 56 meshing with the gear 10 and also with the gear 57 on the armature of the magneto or generator 58.

The low speed shaft, the high speed shaft which passes therethrough, the clutch members carried respectively thereby, the clutch operating mechanisms, the driving gear, the driving sprocket, and the valve cams are concentrically arranged and combined into a unitary structure which can be readily slipped into operative position in the crank case of an engine.

When the lever 30 is turned to one extreme—that shown in the drawings—the threaded sleeve 28 is carried outward. This releases the pin 27 and allows the spring 34 to push the head of the rod 37 inward, which action carries the clutch shell inward and causes the annular plates 42 connected with the clutch shell and disks 44 connected with the high speed shaft to be bound together between the clutch shell and the disk 46 in the usual manner of disk clutches, depending upon the force exerted by the spring. With these parts thus engaged the driving sprocket 40 carried by the clutch shell is clutched directly to the high speed shaft which is driven by the engagement with the gear 10 of the pinion on the engine crank shaft. As a result of this direct connection between the engine and the driving sprocket the machine will be driven at high speed. When from this position the speed change and clutch lever is turned to the intermediate position the threaded sleeve 28 is moved a short distance inward. This presses the pin 27 inward and forces the rod 37 outward against the thrust of the spring, which action carries the clutch shell outward and releases the binding friction between the annular plates 42 carried by the shell and the disks 44 carried by the high speed shaft. At this time the annular plates 43 carried by the clutch shell are also loose with relation to the disks 45 carried by the low speed shaft 20, consequently there will be no connection between the driving gear 10 and the driving sprocket 40 and the engine may run without driving the machine. Movement of the clutch and speed change lever from the intermediate position to the other extreme carries the sleeve 28 still farther inward and causes the pin 27 to press the rod 37 still farther outward against the thrust of the spring 34. This movement of the rod 37 carries the clutch shell outward sufficiently to cause the annular plates 43 carried by the clutch shell and the disks 45 carried by the low speed shaft 20 to be bound between the sprocket and the disk 47 on the low speed shaft. When these are bound, as in the manner of a common disk clutch, the low speed shaft is connected with the clutch shell in such manner that the driving gear 10 through the pinion 13, the gear 48, pinion 51 and gear 52 will turn the driving sprocket 40, and as this is a reduction gear the machine will be driven at low speed. At this time, of course, as the clutch shell is way out there is no frictional binding between the annular plates 42 carried by the clutch shell and the disks 44 carried by the high speed shaft.

In this organization the changes of speed are affected by a simple movement of the hand lever without any shifting of gears, and no change can be made from high to low or low to high without first disengaging both sections of the clutch. As all of the mechanisms are centered about the high speed shaft the organization is very compact and can be located in the crank case close to the engine.

The invention claimed is;

1. In a motor vehicle the combination with the engine crank shaft, of a driving gear driven from the crank shaft, a high speed shaft driven directly by the driving gear, a low speed shaft driven indirectly from the driving gear, a driving sprocket, disk clutch members interposed between said high speed shaft and the driving sprocket, disk clutch members interposed between said low speed shaft and the driving sprocket, a spring for causing the engagement of the high speed clutch members, and means for causing the release of the high speed clutch members and for causing the engagement of the low speed clutch members.

2. In a motor vehicle the combination with the engine crank shaft, of a driving gear driven from the crank shaft, a high speed shaft driven directly by the driving gear, a low speed shaft mounted concentric with the high speed shaft and driven indirectly from the driving gear, a driving sprocket, disk clutch members interposed between said high speed shaft and the driving sprocket, disk clutch members interposed between said low speed shaft and the driving sprocket, a spring for causing the engagement of the high speed clutch members, and means for causing the release of the high speed clutch members and for causing the engagement of the low speed clutch members.

3. In a motor driven vehicle the combination with the engine crank shaft, of a driving gear driven from the crank shaft, a tubular high speed shaft driven directly by the driving gear, a tubular low speed shaft mounted concentric with the high speed shaft and driven indirectly from the driving gear, a driving sprocket, disk clutch members interposed between said high speed shaft and the driving sprocket, disk clutch members interposed between said low speed shaft and the driving sprocket, a spring arranged in the high speed shaft for causing the engagement of the high speed clutch members, and means for causing the release of the high speed clutch members and for causing the engagement of the low speed clutch members.

4. In a motor driven vehicle the combination with the engine crank shaft, of a driving gear driven from the crank shaft, a tubular high speed shaft driven directly by the driving gear, a tubular low speed shaft mounted concentric with the high speed shaft and driven indirectly from the driving gear, a driving sprocket concentric with said shafts, disk clutch members concentric with the high speed shaft and interposed between said shaft and the driving sprocket, disk clutch members concentric with the low speed shaft and interposed between said shaft and the driving sprocket, a spring for causing the engagement of the high speed clutch members, and means for causing the release of the high speed clutch members and for causing the engagement of the low speed clutch members.

5. In a motor driven vehicle the combination with the engine crank shaft, of a tubular shaft, means for driving said tubular shaft at high speed, a tubular shaft surrounding said high speed shaft, means for driving said surrounding shaft at low speed, a driving sprocket concentric with said shafts, disk clutch members concentric with the high speed shaft and interposed between said shaft and the driving sprocket, disk clutch members concentric with the low speed shaft and interposed between said shaft and the driving sprocket, and means for causing the engagement of and disengagement of said clutch members.

6. In a motor vehicle the combination with the engine crank shaft, of a tubular shaft, mechanism for driving said shaft at high speed, clutch members carried by said high speed shaft, a tubular shaft surrounding the high speed shaft, mechanism for driving said shaft at low speed, clutch members carried by said low speed shaft, a shell carrying clutch members, a driving sprocket attached to said shell, and mechanism in and concentric with said high speed shaft for moving said shell and sprocket and causing the binding of the clutch members carried by the shell and the clutch members carried by the high speed shaft, or causing the binding of the clutch members carried by the shell and the clutch members carried by the low speed shaft, or causing the disconnection of said clutch members.

7. In a motor vehicle the combination with the engine crank shaft, of tubular shafts arranged one within the other, a gear on the inner shaft and driven from the crank shaft, a pinion on the inner shaft, a gear on the outer shaft, a connected reduction gear and pinion, the said reduction gear engaging the pinion on the inner shaft and said reduction pinion engaging the gear on the outer shaft, clutch members carried by the inner shaft, clutch members carried by the outer shaft, a shell carrying a driving sprocket and clutch members, and means for moving said shell and causing the binding of its clutch members with the clutch members carried by the inner shaft, or causing the binding of its clutch members with the clutch members carried by the outer shaft, or a complete disengagement of said clutch members.

8. In a motor vehicle the combination with the engine crank shaft, of a driving gear driven from the crank shaft, a high speed shaft driven directly by the driving gear, a low speed shaft, speed reduction gears interposed between the low speed shaft and the driving gear, a driving sprocket, disk clutch members interposed between said high speed shaft and the driving sprocket, disk clutch members interposed between said low speed shaft and the driving sprocket, a spring for causing the engagement of the high speed clutch members, and means for causing the release of the high speed clutch members and for causing the engagement of the low speed clutch members.

9. In a motor vehicle the combination with the engine crank shaft, of a driving gear driven from the crank shaft, a high speed shaft driven directly by the driving gear, a low speed shaft mounted concentric with the high speed shaft, speed reduction gears interposed between the low speed shaft and the driving gear, a driving sprocket, disk clutch members interposed between said high speed shaft and the driving sprocket, disk clutch members interposed between said low speed shaft and the driving sprocket, a spring for causing the engagement of the high speed clutch members, and means for causing the release of the high speed clutch members and for causing the engagement of the low speed clutch members.

10. In a motor driven vehicle the combination with the engine crank shaft, of a driving gear driven from the crank shaft, a tubular high speed shaft driven directly by the driving gear, a tubular low speed shaft mounted concentric with the high speed shaft, speed reduction gears interposed between the low speed shaft and the driving gear, a driving sprocket, disk clutch members interposed between said high speed shaft and the driving sprocket, disk clutch members interposed between said low speed shaft and the driving sprocket, a spring arranged in the high speed shaft for causing the engagement of the high speed clutch members, and means for causing the release of the high speed clutch members and for causing the engagement of the low speed clutch members.

11. In a motor driven vehicle the combination with the engine crank shaft, of a driving gear driven from the crank shaft, a tubular high speed shaft driven directly by the driving gear, a tubular low speed shaft mounted concentric with the high speed shaft, speed reduction gears interposed between the low speed shaft and the driving gear, a driving sprocket concentric with said shafts, disk clutch members concentric with the high speed shaft and interposed between said shaft and the driving sprocket, disk clutch members concentric with the low speed shaft and interposed between said shaft and the driving sprocket, a spring for causing the engagement of the high speed clutch members, and means for causing the release of the high speed clutch members and for causing the engagement of the low speed clutch members.

12. In a motor vehicle the combination with the engine crank shaft, of a tubular shaft, mechanism for driving said shaft at high speed, clutch members carried by said high speed shaft, a tubular shaft surrounding the high speed shaft, mechanism for driving said shaft at low speed, clutch members carried by said low speed shaft, a shell carrying clutch members, a driving sprocket connected with said shell, and mechanism in and concentric with said high speed shaft for moving said shell and causing the binding of the clutch members carried by the shell and the clutch members carried by the high speed shaft, or causing the binding of the clutch members carried by the shell and the clutch members carried by the low speed shaft, or causing the disconnection of said clutch members.

13. In a motor vehicle the combination with the engine crank shaft, of a tubular high speed shaft, clutch members carried by said high speed shaft, a tubular low speed shaft surrounding the high speed shaft, clutch members carried by said low speed shaft, a shell carrying clutch members, a driving sprocket connected with said shell, and mechanism in said high speed shaft for moving said shell and causing the binding of the clutch members carried by the shell and the clutch members carried by the high speed shaft, or causing the binding of the clutch members carried by the shell and the clutch members carried by the low speed shaft, or causing the disconnection of said clutch members.

14. In a motor vehicle the combination with the engine crank shaft, of two tubular shafts arranged one within the other, a reduction gear for driving one shaft at less speed than the other, clutch members carried by the inner shaft, clutch members carried by the outer shaft, a shell carrying a driving sprocket and clutch members, and means for moving said shell and causing the binding of its clutch members with the clutch members carried by the inner shaft, or causing the binding of its clutch members with the clutch members carried by the outer shaft, or a complete disengagement of said clutch members.

15. In a motor vehicle the combination with the engine crank shaft, of two tubular shafts arranged one within the other, a reduction gear for driving one shaft at less speed than the other, clutch members carried by the inner shaft, clutch members carried by the outer shaft, a shell carrying a driving sprocket and clutch members, means for moving said shell inward and causing the binding of its clutch members with the clutch members carried by the inner shaft, and means for moving said shell outward and causing the binding of its clutch members with the clutch members carried by the outer shaft.

16. In a motor vehicle the combination with the engine crank shaft, of two tubular shafts arranged one within the other, a reduction gear for driving one shaft at less speed than the other, clutch members carried by the inner shaft, clutch members carried by the outer shaft, a shell carrying a driving sprocket and clutch members, a spring for drawing said shell inward and causing the binding of its clutch members with the clutch members carried by the inner shaft, and mechanism for moving the shell outward and causing the binding of its clutch members with the clutch members carried by the outer shaft.

17. A motor vehicle clutch and transmission consisting of two tubular shafts arranged one within the other, a reduction gear for driving one shaft at less speed than the other, clutch members carried by the inner shaft, clutch members carried by the outer shaft, a shell carrying a driving sprocket and clutch members, a spring for drawing said shell inward and causing the binding of its clutch members with the clutch members carried by one shaft, and mechanism for moving the shell outward and causing the binding of its clutch members with the clutch members carried by the other shaft, or a complete disengagement of said clutch members.

18. A motor vehicle clutch and transmission consisting of two tubular shafts one arranged within the other, a reduction gear for driving one shaft at less speed than the other, clutch members carried by the inner shaft, clutch members carried by the outer shaft, a shell carrying clutch members, a spring for drawing said shell one way and causing the binding of its clutch members with the clutch members carried by one shaft and mechanism for moving the shell the other way and causing the binding of its clutch members with the clutch members carried by the other shaft.

19. In a motor driven vehicle the combination with the engine crank shaft of two shafts one arranged within the other, a reduction gear for driving one shaft at less speed than the other, clutch members carried by the inner shaft, clutch members carried by the outer shaft, a shell carrying clutch members, means for thrusting said shell inward and causing the binding of its clutch members with the clutch members carried by one shaft and means for thrusting said shell outward and causing the binding of its clutch members with the clutch members carried by the outer shaft.

20. In a motor driven vehicle the combination with the engine crank shaft of a shaft, means for driving said shaft at high speed, a shaft surrounding said high speed shaft, means for driving said surrounding shaft at low speed, a driving sprocket concentric with said shafts, disk clutch members concentric with the high speed shaft and interposed between said shaft and the driving sprocket, disk clutch members concentric with the low speed shaft and interposed between said shaft and the driving sprocket, and means for causing the engagement of and disengagement of said clutch members.

21. A motor vehicle clutch and variable speed transmission consisting of two shafts one arranged within the other, a reduction gear for driving one shaft at less speed than the other, clutch members carried by the inner shaft, clutch members carried by the outer shaft, a driving sprocket, clutch members connected with the driving sprocket, means for moving said sprocket clutch members one way and binding them with the clutch members carried by one shaft, and means for moving said sprocket clutch members the other way and binding them with the clutch members carried by the other shaft.

RAYMOND A. BECKWITH.